United States Patent
Law et al.

(10) Patent No.: US 8,321,249 B2
(45) Date of Patent: Nov. 27, 2012

(54) DETERMINING A DEMOGRAPHIC ATTRIBUTE VALUE OF AN ONLINE DOCUMENT VISITED BY USERS

(75) Inventors: Ching Law, Los Angeles, CA (US); Gokul Rajaram, Los Altos, CA (US); Rama Ranganath, San Francisco, CA (US)

(73) Assignee: Google Inc., Mountain View, CA (US)

(*) Notice: Subject to any disclaimer, the term of this patent is extended or adjusted under 35 U.S.C. 154(b) by 1419 days.

(21) Appl. No.: 11/699,754

(22) Filed: Jan. 30, 2007

(65) Prior Publication Data
US 2008/0183557 A1 Jul. 31, 2008

(51) Int. Cl.
*G06Q 10/00* (2006.01)
(52) U.S. Cl. .................................... 705/7.11; 705/1.1
(58) Field of Classification Search .................. 705/7.11, 705/1.1
See application file for complete search history.

(56) References Cited

U.S. PATENT DOCUMENTS

| | | | |
|---|---|---|---|
| 6,327,574 B1 * | 12/2001 | Kramer et al. ............. | 705/14.66 |
| 6,606,657 B1 | 8/2003 | Zilberstein et al. | |
| 7,162,522 B2 | 1/2007 | Adar et al. | |
| 2001/0020242 A1 | 9/2001 | Gupta et al. | |
| 2001/0049620 A1 * | 12/2001 | Blasko ............................ | 705/10 |
| 2002/0152117 A1 * | 10/2002 | Cristofalo et al. ............. | 705/14 |
| 2003/0130982 A1 | 7/2003 | Kasriel et al. | |
| 2004/0205157 A1 * | 10/2004 | Bibelnieks et al. ............ | 709/218 |
| 2005/0021965 A1 * | 1/2005 | Van Horn ....................... | 713/176 |
| 2005/0131762 A1 | 6/2005 | Bharat et al. | |
| 2006/0242147 A1 * | 10/2006 | Gehrking et al. .................. | 707/7 |
| 2007/0180469 A1 * | 8/2007 | Finley et al. ..................... | 725/46 |
| 2008/0183556 A1 | 7/2008 | Law et al. | |

FOREIGN PATENT DOCUMENTS

WO WO 99/60503 11/1999

OTHER PUBLICATIONS

PCT/ISA/220, "Notification of Transmittal of the International Search Report and the Written Opinion of the International Searching Authority, or the Declaration" for PCT/US2008/052513, mailed Jun. 30, 2008 (1 pg.).
PCT/ISA/210, "International Search Report" for PCT/US2008/052513, mailed Jun. 30, 2008 (3 pgs.).
PCT/ISA/237, "Written Opinion of the International Searching Authority" for PCT/US2008/052513, mailed Jun. 30, 2008 (10 pgs.).

* cited by examiner

*Primary Examiner* — Thomas Mansfield
(74) *Attorney, Agent, or Firm* — John C. Pokotylo; Straub & Pokotylo

(57) ABSTRACT

A demographic attribute value of a sink online document may be determined by (a) accepting a value(s) of the demographic attribute of a source online document, (b) accepting, for each of the source online documents having an accepted demographic attribute value, a probability that a user will visit or has visited the sink online document if the user visited the source online document, and (c) determining the demographic attribute value of the sink online document using the demographic attribute value of each of the source online documents and the probabilities. A demographic attribute value of the sink online document may also be determined using the above information and using the demographic attribute value of each of the source online documents and the probabilities that a user will visit or has visited the sink online document if the user visited the other online document.

26 Claims, 5 Drawing Sheets

DETERMINING A DEMOGRAPHIC ATTRIBUTE VALUE OF AN ONLINE DOCUMENT VISITED BY USERS

§1. BACKGROUND OF THE INVENTION

§1.1 Field of the Invention

The present invention concerns determining demographic information. In particular, the present invention concerns probabilistically determining demographic information for a domain, such as a Website for example.

§1.2 Background Information

Demographic targeting is an important mode of targeting used by advertisers. Currently, demographic information is typically only available for large Websites on the Internet. This is likely because the third parties that supply demographic information do so using a panel of 50,000-100,000 users. Consequently, these third parties can only get statistically significant user data for large Websites. This means that there is no way for these third parties to infer the user demographics for the vast majority of Websites on the Internet. This is unfortunate, because having reliable Internet-wide demographics, would enable more advertising revenue to become available to smaller Websites, instead of just the large ones for which demographics are known.

Naturally, small Websites could self-describe their demographics. However, advertisers would probably not trust data supplied directly by the Website owner. For example, Website owners have an incentive to say "My visitors are all spendthrift millionaires", whether or not this is true, in order to attract high-revenue advertisements.

§2. SUMMARY OF THE INVENTION

Embodiments consistent with the present invention determine a demographic attribute value of a sink online document. At least some embodiments may do so by (a) accepting a value(s) of the demographic attribute, each of the demographic attribute value(s) being associated with a source online document (one having a value for the demographic attribute), (b) accepting, for each of the source online documents having an accepted demographic attribute value, a probability that a user will visit or has visited the sink online document if the user visited the source online document, and (c) determining the demographic attribute value of the sink online document using (i) the accepted demographic attribute value of each of the source online documents and (ii) the accepted probabilities.

At least some other embodiments consistent with the present invention may determine a demographic attribute value of a set of one or more sink online documents by (a) accepting value(s) of the demographic attribute, each of the demographic attribute value(s) being associated with a source online document, (b) accepting, for each of the sink online document(s), and for each of a plurality of other sink and source online documents, a probability that a user will visit or has visited the sink online document if the user visited the other online document, (c) determining, for each of the sink online document(s), the demographic attribute value of the sink online document using (i) the accepted demographic attribute value of each of the source online documents and (ii) the accepted probabilities that a user will visit or has visited the sink online document if the user visited the other online document, and (d) for each of the sink online document(s), determining an updated demographic attribute value of the sink online document using (i) the demographic attribute value of each of the source online documents and the determined demographic attribute value of each of the other sink online documents and (ii) the accepted probabilities that a user will visit or has visited the sink online document and each of the other online documents. In at least some embodiments consistent with the present invention, the act of act determining an updated demographic attribute value of each sink online document is repeated at least once. For example, this act may be repeated until the updated demographic attribute values don't change from the previously determined updated demographic attribute values.

In at least some embodiments consistent with the present invention, the documents may be Web pages, or Websites, for example.

§3. BRIEF DESCRIPTION OF THE DRAWINGS

§4. DETAILED DESCRIPTION

The present invention may involve novel methods, apparatus, message formats, and/or data structures for probabilistically determining demographic information of a domain, such as a Website for example, by using a set of source domains with known demographic information and pair-wise relations between such source domains and one or more sink domains for which demographic information is to be inferred. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

In the following, exemplary environments in which, or with which, exemplary embodiments consistent with the present invention may operate, are described in §4.1. Then, exemplary embodiments consistent with the present invention are described in §4.2. Some illustrative examples of exemplary operations of exemplary embodiments consistent with the present invention are provided in §4.3. Finally, some conclusions regarding the present invention are set forth in §4.4.

Figure 1:
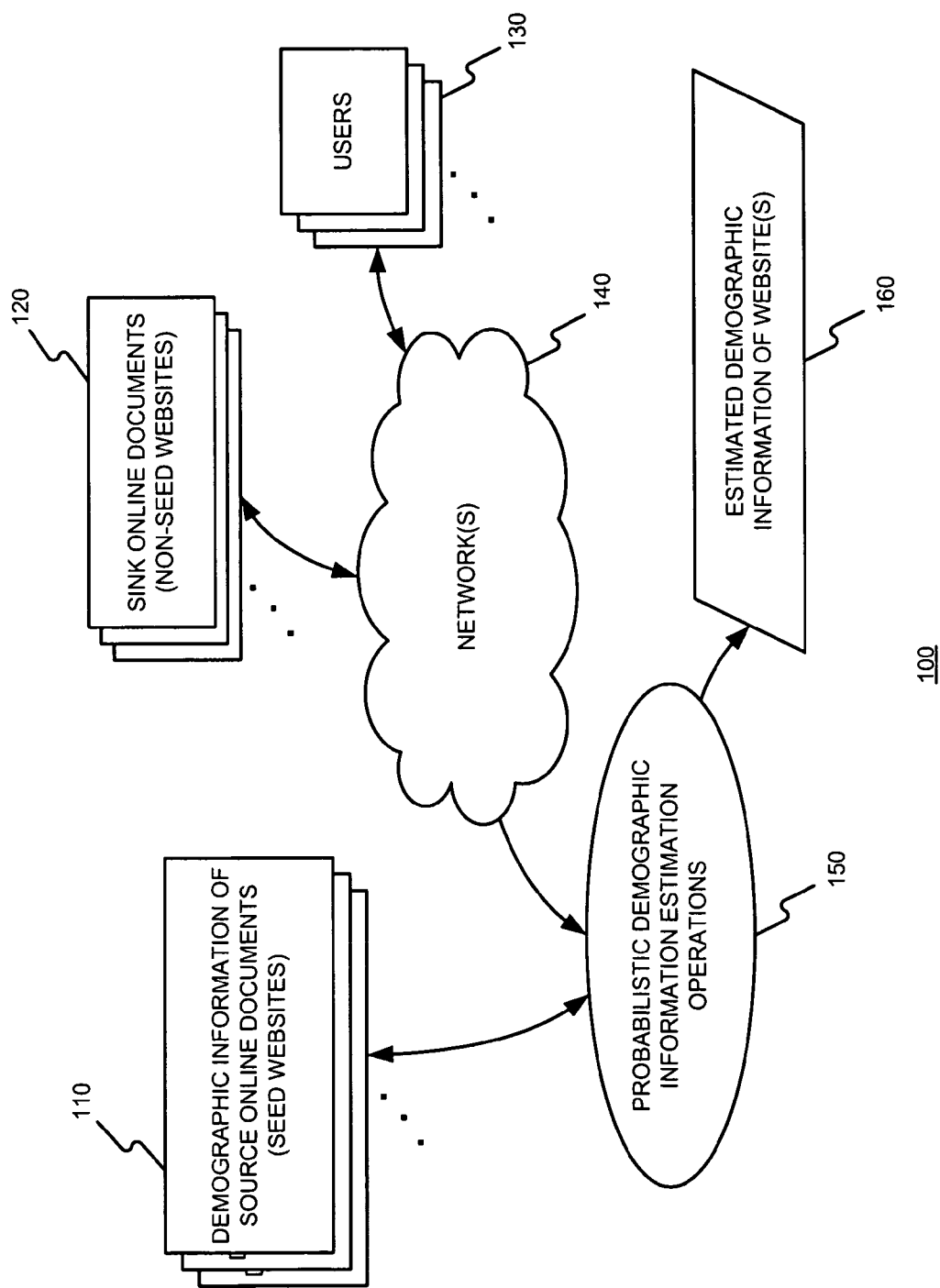
FIG. 1 is a bubble diagram illustrating various operations that may be performed, and various information that may be used and/or generated, by embodiments consistent with the present invention.

§4.1 Exemplary Environment in which, or with which, Exemplary Embodiments Consistent with the Present Invention May Operate FIG. 1 is a bubble diagram illustrating various operations that may be performed, and various information that may be used and/or generated, by such operations in a exemplary environment in which, or with which, exemplary embodiments consistent with the present invention may operate. In particular, the demographic information of source online documents (seed Websites) 110 may be available to the probabilistic demographic information estimation operations 150. Further, the operations 150 may obtain information about Websites visited by users 130 (e.g., from a client device browser toolbar). Such user information may be used to establish pair-wise relations between Websites by tracking users visiting various Websites (both source (or seed) Websites 110 and sink (or non-seed) Websites 120). Using such pair-wise relations between Websites and exacted demographic information of source Websites 110, the operations 150 may probabilistically estimate demographic information of a sink Website 120.

Various exemplary embodiments of the present invention are now described in §4.2 below.

§4.2 Exemplary Embodiments

Figure 2:
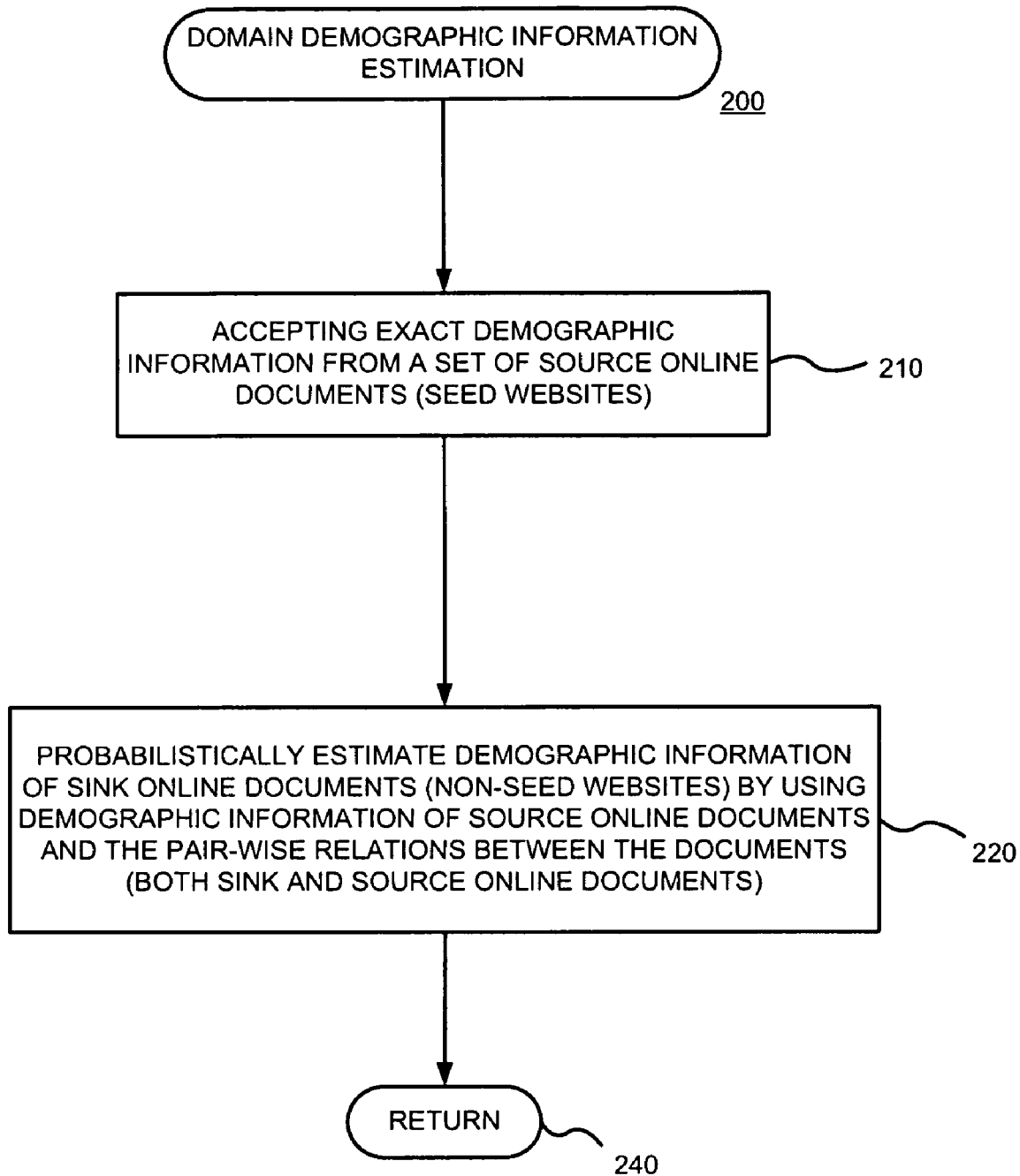
FIG. 2 is a flow diagram of an exemplary method that might be used to probabilistically estimate demographic information of a domain or Website in a manner consistent with the present invention.

FIG. 2 is a flow diagram of an exemplary method 200 that might be used to probabilistically estimate demographic information of a domain or Website in a manner consistent with the present invention. In particular, the method 200 may accept exact demographic information from a set of source online documents (e.g., seed Websites). (Block 210) Thereafter, the method 200 may probabilistically estimate demographic information of sink online documents (e.g., non-seed Websites) by using demographic information of source online documents and the pair-wise relationship between the documents (both sink and source online documents). (Block 220)

Referring back to block 220, the method 200 might probabilistically estimate demographic information as follows. Let d be a demographics attribute, which is a function a set of Websites to a probability. Thus $d(s) \in [0,1]$ for any Website s. In particular, d(s) is considered as the minimum probability that a pageview on Website s would satisfy this demographics attribute (i.e., that the pageview would be by a user with the demographic attribute). For example, if d is the attribute "age 25-34", then d(site.com)=0.5 means that a pageview on site. com has a minimum probability of 0.5 of being generated from a visitor of age 25-34.

Assume that the function d is only known for a set of source Websites S which is a subset of the universe of all Websites G. Embodiments consistent with the present invention might be used to estimate the values of d on other Websites.

In the following, two alternative approaches for estimating the demographics function d—Upstream/Downstream Traffic, and Users Demographics—are described.

§4.2.1 Upstream/Downstream Traffic Approach

In the Upstream/Downstream Traffic approach, pair-wise relations between Websites are examined by tracking the users who move across the Websites during their browsing sessions.

Let p be a function on set of edges of the graph G, where nodes of the graph G represent domains (e.g., Websites) or Web pages. For any two Websites a and b, let p(a, b) represent the probability that a pageview at Website b is initiated by a visitor of Website a. Function p can be derived from information tracking users who have visited Website a and/or Website b. Such information may be recorded in toolbar traffics logs. For example, if p(aa.com, bb.com)=0.1, then a pageview on bb.com has the probability of 0.1 that it is generated by a visitor of site aa.com.

Some embodiments consistent with the present invention might use a damping factor $\alpha \in (0,1)$ to express how dependent or independent the traffic is of the demographics property. Specifically, if the traffic data is independent of the demographics property, then $\alpha$ would be 1 (1 means no damping factor at all, which is the case when the traffic data is independent of demographics). Otherwise $\alpha$ would be a factor less than 1 indicating some preservation of demographics property in the traffic flow. A reasonable value for $\alpha$ can be derived by observing the demographics of source Websites for which there is traffic data. For example, if only users of a certain demographics property move from Website A to Website B, and if users without this property would move to Website C, then $\alpha$ might be set close to zero for this particular property.

For each site $t \neq s$, a lower-bound estimate of the demographics d on t as contributed by s can be determined as follows:

$$p(s,t) \times d(s) \times \alpha$$

Repeating this calculation for all pairs s, t an estimate of e(t) can be expressed as:

$$e(t) = \alpha \sum_{S \in G} p(s, t) d(s).$$

This can be repeated, using e as function d in the next iteration (e.g, until the estimate is not further improved).

One potential disadvantage of the upstream/downstream traffic approach is that it might depend on the direct clicks between Websites to infer the demographics information. However, a Website's demographics from all the upstream and downstream traffic could deviate from its overall demographics. Notwithstanding such a potential deviation, if it can be assumed that such click traffic should be mostly independent of the overall demographics, then this approach should provide useful estimates.

§4.2.2 Users Demographics Approach

In the users demographics approach, demographics information of a user is inferred from the Websites that they visit (e.g., using client device browser toolbar information). For example, if a user u visits a Website s with d(s)=0.7, then a value 0.7 can be assigned to d (u). If u visits two independent Websites a and b, d (u) can be estimated to be (1−d(a))(1−d (b)). However, in general, it is not easy to show that the demographics of two Websites are independent. Further, given the fact that u visits both Websites, they cannot be assumed to be totally independent.

A simpler approach is to take the average of d(s) for all Websites $s \in S$ visited by u. Let v be the visiting function where v(u, s)=1 if user u visits Website s, and v(u,s)=0 otherwise. Thus, all Websites visited by u may be expressed as $S_u = \{u \in S | v(u, s) = 1\}$. The estimated value of the demographic for the user can be expressed as:

$$e(u) = \frac{\sum_{s \in S_u} d(s)}{|S_u|}.$$

This would be an estimation of the demographics of user u. Then, for any Website t not in S (Note that S is the set of all Websites for which there is demographics information from external source, and it is desired to estimate the demographics function of Websites not in S.), the value of the demographic attribute for the Website t may be estimated as the average value of d(u) for all visitors u ∈ U of Website t:

$$e(t) = \frac{\sum_{u \in U_t} e(u)}{|U_t|},$$

where $U_t = \{u \in U | v(u,t) = 1\}$.

Thus, the users demographics approach can work with either pageviews or unique users. The above formula estimates the demographics of a random visitor of Website t. If frequency estimates of the visitors of Website t are also available, then the demographics of a random pageview at the Website t can also be estimated.

§4.2.3 Evaluation

To evaluate the either of the foregoing approaches, given a Website s in the source set S, the demographics of the Website s can be estimated with either of foregoing techniques. The estimate may then be compared with the given (actual) value d(s). In some conservative embodiments consistent with the present invention, the estimates should not exceed the provided d(s) values for most of the Websites in S.

§4.2.4 Exemplary Methods

Figure 3:
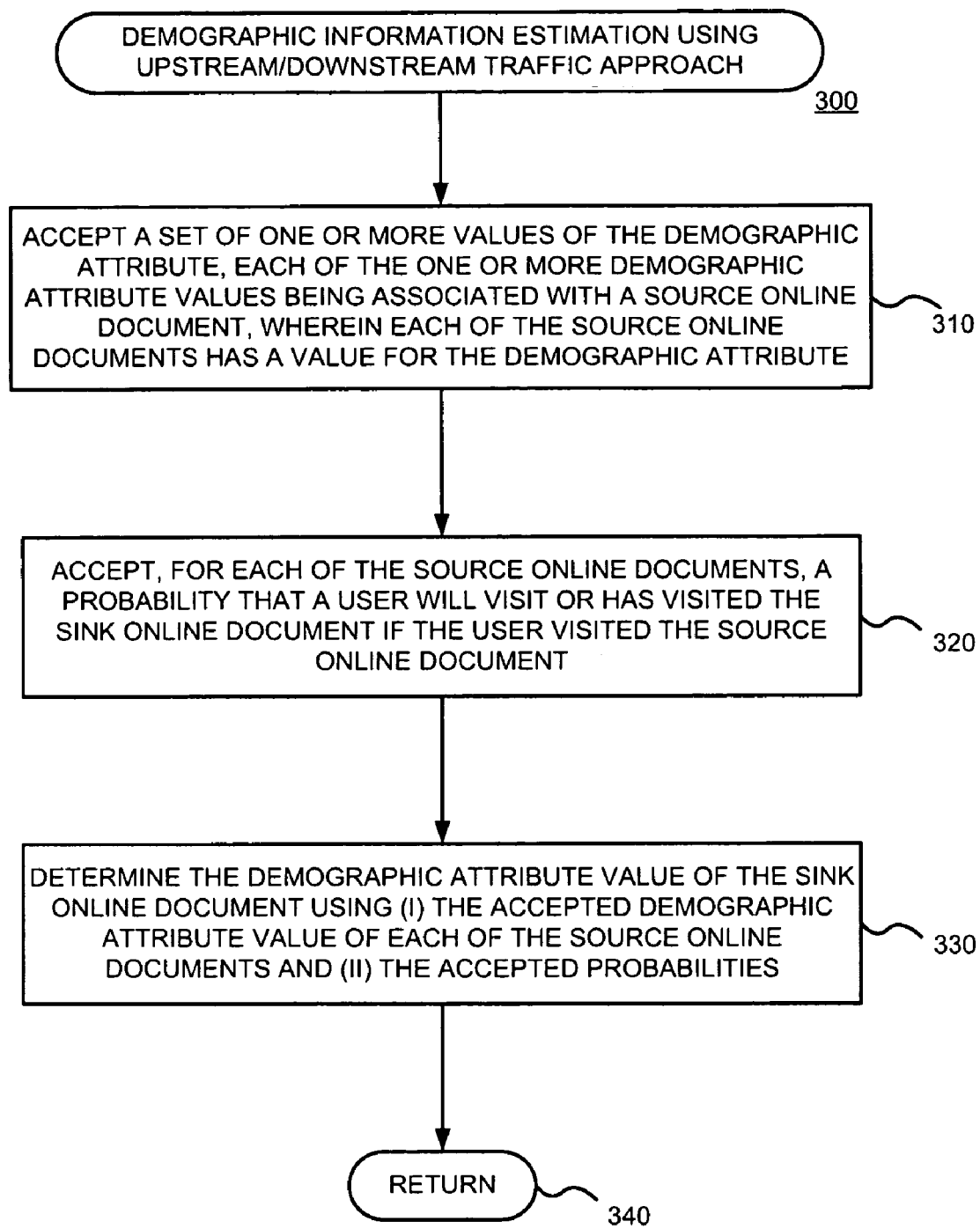
FIG. 3 is a flow diagram of an exemplary method that might be used to generate a first probabilistic estimation of demographic information of a domain or Website in a manner consistent with the present invention.

FIG. 3 is a flowchart illustrating an exemplary method 300 that may be used to determine a demographic attribute of a sink online document based on demographic attribute information of a set of source online documents in a manner consistent with the present invention. In particular, the method 400 may accept a set of one or more values of the demographic attribute, each of the one or more demographic attribute values being associated with a source online document, wherein each of the source online documents has a value for the demographic attribute. (Block 310) The method 300 may accept for each of the source online documents, a probability that a user will visit, or has visited, the sink online document if the user visited the source online document. (Block 320) Finally, the method 300 may determine the demographic attribute value of the sink online document using (i) the accepted demographic attribute value of each of the source online documents and (ii) the accepted probabilities. (Block 330)

Figure 4:
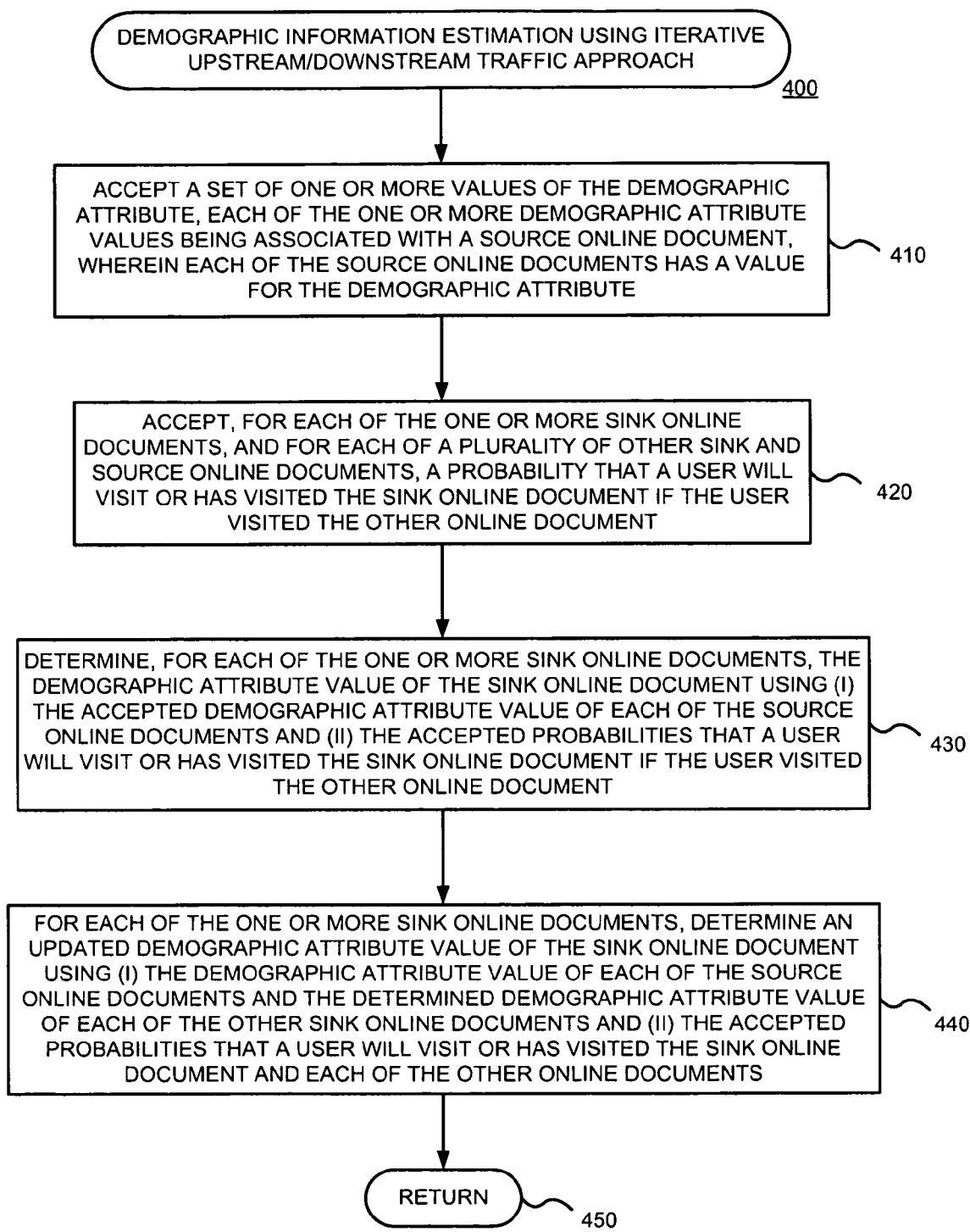
FIG. 4 is a flow diagram of an exemplary method that might be used to generate a final best probabilistic estimation of demographic information of a domain or Website in a manner consistent with the present invention.

FIG. 4 is a flowchart illustrating an exemplary method 400 that may be used to determine a demographic attribute of a sink online document based on demographic attribute information of a set of source online documents in a manner consistent with the present invention. In particular, the method 400 may accept a set of one or more values of the demographic attribute, each of the one or more demographic attribute values being associated with a source online document, wherein each of the source online documents has a value for the demographic attribute. (Block 410) The method 400 may accept, for each of the one or more sink online documents, and for each of a plurality of other sink and source online documents, a probability that a user will visit, or has visited, the sink online document if the user visited the other online document. (Block 420) Subsequently, the method 400 may determine, for each of the one or more sink online documents, the demographic attribute value of the sink online document using (i) the accepted demographic attribute value of each of the source online documents and (ii) the accepted probabilities that a user will visit or has visited the sink online document if the user visited the other online document. (Block 430) Finally, for each of the one or more sink online documents, the method 400 may determine an updated demographic attribute value of the sink online document using (i) the demographic attribute value of each of the source online documents and the determined demographic attribute value of each of the other sink online documents and (ii) the accepted probabilities that a user will visit or has visited the sink online document and each of the other online documents. (Block 440)

Referring back to blocks 330 and 430, the methods 300 and 400 may determine a demographic attribute value of the sink online documents by summing, over all the source online documents, a product of (i) the accepted probabilities that a user will visit, or has visited, the sink online document if the user visited the source online document and (ii) the demographic attribute value of the source online document. In some embodiments consistent with the present invention, the act of determining, for each of the sink online documents, the demographic attribute value of the sink online document might include multiplying the sum by a predetermined damping factor.

Referring back to block 440, the method 400 may repeat the process of determining an updated demographic attribute value of the sink online document for each of the one or more sink online documents, until the updated demographic attribute values don't change (or don't change much, such as change less than a predetermined amount) from the previously determined updated demographic attribute values.

§4.2.5 Exemplary Apparatus

Figure 5:
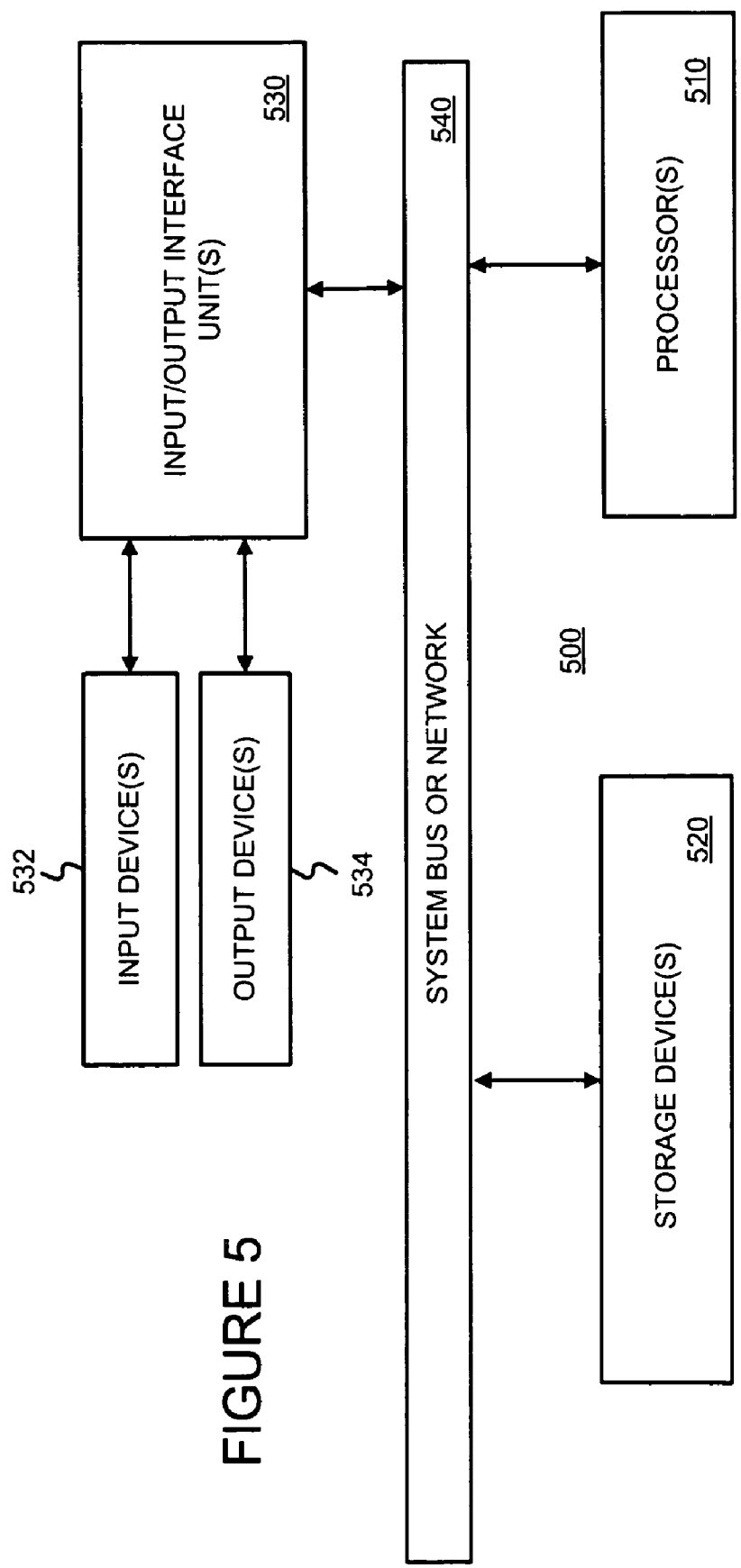
FIG. 5 is a block diagram of an exemplary apparatus that may perform various operations and store information in a manner consistent with the present invention.

FIG. 5 is high-level block diagram of a machine 500 that may perform one or more of the operations discussed above. The machine 500 basically includes one or more processors 510, one or more input/output interface units 530, one or more storage devices 520, and one or more system buses and/or networks 540 for facilitating the communication of information among the coupled elements. One or more input devices 532 and one or more output devices 534 may be coupled with the one or more input/output interfaces 530. The machine 500 may be, for example, an advertising server, or it may be a plurality of servers distributed over a network.

The one or more processors 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 520 and/or may be received from an external source via one or more input interface units 530. The machine-executable instructions might be stored as modules (e.g., corresponding to the above-described operations).

In one embodiment consistent with the present invention, the machine 500 may be one or more conventional personal computers. In this case, the processing units 510 may be one or more microprocessors. The bus 540 may include a system bus. The storage devices 520 may include system memory, such as read only memory (ROM) and/or random access memory (RAM). The storage devices 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. The output devices 534 may include a monitor or other type of display device, which may also be connected to the system bus 540 via an appropriate interface. In addition to (or instead of) the monitor, the personal computer may include other (peripheral) output devices (not shown), such as speakers and printers for example.

Referring back to claim 1, the online documents might be documents served by server computers. The users 130 might access the online documents using a client device, such as a personal computer, a mobile telephone, a mobile device, etc., having a browser. The operations 150 might be performed by one or more computers.

§4.2.6 Refinements and Alternatives

The source demographic attribute information might be exact or non-exact demographic information of a small set of large Websites. This information might be collected from the Internet surfing behavior of opted-in panelists (e.g., 50,000-100,000 in number) whose exact demographics are known. For each Website in this list, the information supplied might include one or more of the following demographic information: Age, Gender, Household Income, Education, # Children (Household size), Connection speed, etc. Thus, this data might be used as "seed" data.

The surfing behavior of an extremely large number (e.g., millions) of users might be analyzed to compute user traffic inflows and outflows for every Website. This data might be obtained from client software (e.g., a browser toolbar) installed on users' computers.

Although some of the exemplary embodiments were discussed in the context of Websites, embodiments consistent with the present invention might be used to infer demographic information in other contexts such as, for example, domains, Web pages, documents, etc.

§4.3 Examples of Operations

A simplified example is provided to illustrate operations of an exemplary embodiment consistent with the present invention. Assume that the universe of all Websites, is $G=\{S_1, S_2, S_3, S_4\}$ and the source Websites, which is a subset of G, is the following: $S=\{S_2, S_3\}$. Demographic information for the source Websites are known. The following is a sample of some demographic information for the two seed websites $S_2$ and $S_3$.

| Demographic property | Website $S_2$ | Website $S_3$ |
|---|---|---|
| Age (20-35) | 80% | 60% |
| Age (36-60) | 20% | 40% |
| Gender M | 85% | 75% |
| Gender F | 15% | 25% |
| Household income ($70K-$100K) | 10% | 45% |

Assume that d(S) is the demographic property that "users are male". It is known from the table above that $d(S_2)=0.85$ and $d(S_3)=0.75$. The objective is to probabilistically estimate $d(S_1)$ and $d(S_4)$ (that is, the probability that a page view of $S_1$ and $S_4$ will be to a male) using pair-wise relations between Websites (represented as a probability (p(a, b)) and the estimation function $$e(S_\omega) = \alpha \sum_{S \in G} p(S, S_\omega) d(S).$$

In this example, assume that the damping factor $\alpha=0.90$.

The pair-wise relations between Websites are examined by tracking the users who move across the Websites during their browser sessions. These pair-wise relations can be represented as a probability by p(a, b) which simply can be interpreted as the probability that a visit at Website "b" is initiated by a visitor of Website "a". These probabilities can be easily acquired from tracked user navigation (e.g., from browser client toolbars).

Assume that the following pair-wise relations for the above example have been acquired:

$p(S_2, S_1)=0.35$ $p(S_3, S_1)=0.50$ $p(S_2, S_4)=0.15$ $p(S_3, S_4)=0.40$ $p(S_4, S_1)=0.20$ $p(S_1, S_4)=0.10$

Having all the information presented above, it is now possible to probabilistically estimate the demographics function d(S) for all non-seed Websites in G.

For Website $S_1$:

$$e(S_1) = 0.9 \sum_{S \in G} p(S, S_1) d(S) \rightarrow e(S_1)$$

$$= 0.90(p(S_2, S_1)d(S_2) + p(S_3, S_1)d(S_3))$$

$$= 0.90(0.35 \cdot 0.85 + \cdot 0.50 \cdot 0.75) \rightarrow e(S_1)$$

$$= 0.61$$

For Website $S_4$:

$$e(S_4) = 0.9 \sum_{S \in G} p(S, S_4) d(S) \rightarrow e(S_1)$$

$$= 0.90(p(S_2, S_4)d(S_2) + p(S_3, S_4)d(S_3))$$

$$= 0.90(0.15 \cdot 0.85 + 0.40 \cdot 0.75) \rightarrow e(S_4)$$

$$= 0.38$$

The above results represent a first estimate of the demographics property that "users are male" at Websites $S_1$ and $S_4$. So in the first iteration the results are:

$d(S_1)=0.61; d(S_2)=0.85; d(S_3)=0.75;$ and $d(S_4)=0.38$.

Now the estimation function might be applied again using the results from the first iteration in order to get a better estimate:

For website $S_1$:

$$e(S_1) = 0.9 \sum_{S \in G} p(S, S_1)d(S) \to e(S_1)$$
$$= 0.90(p(S_2, S_1)d(S_2) + p(S_3, S_1)d(S_3) + p(S_4, S_1)d(S_4)) \to e(S_1)$$
$$= 0.90(0.35 \cdot 0.85 + 0.50 \cdot 0.75 + 0.20 \cdot 0.38) \to e(S_1)$$
$$= 0.67$$

For website $S_4$:

$$e(S_4) = 0.90 \sum_{S \in G} p(S, S_4)d(S) \to e(S_4)$$
$$= 0.90(p(S_2, S_4)d(S_2) + p(S_3, S_4)d(S_3) + p(S_1, S_4)d(S_1)) \to e(S_4)$$
$$= 0.90(0.15 \cdot 0.85 + 0.40 \cdot 0.75 + 0.10 \cdot 0.61) \to e(S_4)$$
$$= 0.44$$

So in the second iteration, the results are:

$d(S_1)=0.67; d(S_2)=0.85; d(S_3)=0.75;$ and $d(S_4)=0.44$.

The estimation function might be applied again using the results from the second iteration in order to get a better estimate:

For website $S_1$:

$$e(S_1) = 0.9 \sum_{S \in G} p(S, S_1)d(S) \to e(S_1)$$
$$= 0.90(p(S_2, S_1)d(S_2) + p(S_3, S_1)d(S_3) + p(S_4, S_1)d(S_4)) \to e(S_1)$$
$$= 0.90(0.35 \cdot 0.85 + 0.50 \cdot 0.75 + 0.20 \cdot 0.44) \to e(S_1)$$
$$= 0.68$$

For website $S_4$:

$$e(S_4) = 0.9 \sum_{S \in G} p(S, S_4)d(S) \to e(S_4)$$
$$= 0.90(p(S_2, S_4)d(S_2) + p(S_3, S_4)d(S_3) + p(S_1, S_4)d(S_1)) \to e(S_4)$$
$$= 0.90(0.15 \cdot 0.85 + 0.40 \cdot 0.75 + 0.10 \cdot 0.67) \to e(S_4)$$
$$= 0.45$$

So in the third iteration, the results are:

$d(S_1)=0.68; d(S_2)=0.85; d(S_3)=0.75$ and $d(S_4)=0.45$.

The estimation function might be applied again using the results from the third iteration in order to get a better estimate:

For Website $S_1$:

$$e(S_1) = 0.9 \sum_{S \in G} p(S, S_1)d(S) \to e(S_1)$$
$$= 0.90(p(S_2, S_1)d(S_2) + p(S_3, S_1)d(S_3) + p(S_4, S_1)d(S_4)) \to e(S_1)$$
$$= 0.90(0.35 \cdot 0.85 + 0.50 \cdot 0.75 + 0.20 \cdot 0.45) \to e(S_1)$$
$$= 0.69$$

For Website $S_4$:

$$e(S_4) = 0.9 \sum_{S \in G} p(S, S_4)d(S) \to e(S_4)$$
$$= 0.90(p(S_2, S_4)d(S_2) + p(S_3, S_4)d(S_3) + p(S_1, S_4)d(S_1)) \to e(S_4)$$
$$= 0.90(0.15 \cdot 0.85 + 0.40 \cdot 0.75 + 0.10 \cdot 0.68) \to e(S_4)$$
$$= 0.45$$

So for the fourth iteration, the results are:

$d(S_1)=0.69; d(S_2)=0.85; d(S_3)=0.75$ and $d(S_4)=0.45$.

These results represent, in this exemplary embodiment, a final estimate for the values given. As a result, it has now been estimated probabilistically that 69% of users visiting Website $S_1$ are male and 45% of users visiting Website $S_4$ are male. It is possible to probabilistically estimate any other demographic attribute (e.g., age 20-35, age 36-60, household income $70K-$100K, etc.) for Websites $S_1$ and $S_4$ in the same manner.

§4.4 Conclusions

As can be appreciated from the foregoing, embodiments consistent with the present invention may be used to provide useful estimates of demographic information for domains, such as Websites for example.

What is claimed is:

1. A computer-implemented method for determining an estimated demographic attribute value of a first online document, the method comprising:
  a) accepting, by a computer system including at least one computer, a set of one or more known values of a demographic attribute, each of the one or more known demographic attribute values being associated with an online document included in a plurality of second online documents, wherein each of the second online documents has a known value for the demographic attribute;
  b) accepting, by the computer system, tracked Internet surfing behavior of a plurality of independent users;
  c) analyzing, by the computer system and for each of the second online documents, the tracked Internet surfing behavior of the plurality of independent users to determine a probability that a user who has visited the second online document will visit or has visited the first online document, wherein the probability represents a single pair-wise relation between the second online document and the first online document;
  d) determining, by the computer system, the estimated demographic attribute value of the first online document using (i) the accepted known demographic attribute value of each of the second online documents and (ii) the determined probabilities; and
  e) associating, by the computer system, the demographic attribute and its determined estimated demographic attribute value with the first online document,
    wherein each of the plurality of second online documents is one of (A) a Website, or (B) a Web page for which the demographic attribute value of the demographic attribute is known, and wherein the first online document is one of (A) a Website, or (B) a Web page for which the estimated demographic attribute value of the demographic attribute is determined.

2. The computer-implemented method of claim 1 wherein the act of determining the estimated demographic attribute value of the first online document includes summing, over the plurality of second online documents, a product of (i) the probability that the particular user who has visited the second online document will visit or has visited the first online document and (ii) the known demographic attribute value of the second online document.

3. The computer-implemented method of claim 2 wherein the act of determining the estimated demographic attribute value of the first online document includes multiplying the sum by a predetermined damping factor.

4. The computer-implemented method of claim 1 wherein the first online document does not initially have a value for the demographic attribute.

5. A computer-implemented method for determining an estimated demographic attribute value of a set of one or more first online documents, the method comprising:

a) accepting, by a computer system including at least one computer, a set of one or more known values of a demographic attribute, each of the one or more known demographic attribute values being associated with an online document included in a plurality of second online documents, wherein each of the second online documents has a known value for the demographic attribute;

b) accepting, by the computer system, tracked Internet surfing behavior of a plurality of Independent users;

c) analyzing, by the computer system and for each of the one or more first online documents, and for each of a plurality of other first and second online documents, the tracked Internet surfing behavior of the plurality of independent users to determine a probability that a user who has visited the other online document, will visit or has visited the first online document;

d) determining, by the computer system, for each of the one or more first online documents, the estimated demographic attribute value of the first online document using (i) the accepted known demographic attribute value of each of the second online documents and (ii) the determined probabilities that a particular user who has visited the other online document, will visit or has visited the first online document;

e) for each of the one or more first online documents, determining, by the computer system, an updated estimated demographic attribute value of the first online document using (i) the known demographic attribute value of each of the second online documents and the determined demographic attribute value of each of the other first online documents and (ii) the determined probabilities that a user will visit or has visited the first online document and each of the other online documents; and f) associating, by the computer system, the demographic attribute and its determined estimated demographic attribute value with the first online document, wherein each of the plurality of second online documents is one of (A) a Website, or (B) a Web page for which the demographic attribute value of the demographic attribute is known, and wherein the first online document is one of (A) a Website, or (B) a Web page for which the estimated demographic attribute value of the demographic attribute is determined.

6. The computer-implemented method of claim 5 wherein act (d) is repeated at least once.

7. The computer-implemented method of claim 5 wherein act (e) is repeated until the updated estimated demographic attribute values don't change from the previously determined updated estimated demographic attribute values.

8. The computer-implemented method of claim 5 wherein the act of determining, for each of the first online documents, the estimated demographic attribute value of the first online document includes summing, over all the second online documents, a product of (i) the determined probabilities that a user who has visited the second online document, will visit or has visited the first online document and (ii) the known demographic attribute value of the second online document.

9. The computer-implemented method of claim 8 wherein the act of determining, for each of the first online documents, the estimated demographic attribute value of the first online document includes multiplying the sum by a predetermined damping factor.

10. The computer-implemented method of claim 5 wherein each of the first online documents does not initially have a value for the demographic attribute.

11. Apparatus for determining an estimated demographic attribute value of a first online document, the apparatus comprising:

a) at least one processor;

b) an input device; and c) at least one storage device storing a computer executable code which, when executed by the at least one processor, performs a method of 1) accepting a set of one or more known values of a demographic attribute, each of the one or more known demographic attribute values being associated with an online document included in a plurality of second online documents, wherein each of the second online documents has, a known value for the demographic attribute, 2) accepting tracked Internet surfing behavior of a plurality of Independent users, 3) for each of the second online documents having an accepted known demographic attribute value, analyzing the tracked Internet surfing behavior of a plurality of independent users to determine a probability that a user who has visited the second online document will visit or has visited the first online document, wherein the probability represents a single pair-wise relation between the second online document and the first online document, 4) the estimated demographic attribute value of the first online document using (i) the accepted known demographic attribute value of each of the second online documents and (ii) the determined probabilities, and 5) associating the demographic attribute and its determined estimated demographic attribute value with the first online document, wherein each of the plurality of second online documents is one of (A) a Website, or (B) a Web page for which the demographic attribute value of the demographic attribute is known, and wherein the first online document is one of (A) a Website, or (B) a Web page for which the estimated demographic attribute value of the demographic attribute is determined.

12. The apparatus of claim 11 wherein the first online document does not initially have a value for the demographic attribute.

13. Apparatus for determining an estimated demographic attribute value of a set of one or more first online documents, the apparatus comprising:
  a) at least one processor;
  b) an input device; and
  c) at least one storage device storing a computer executable code which, when executed by the at least one processor, performs a method of
    1) accepting a set of one or more known values of a demographic attribute, each of the one or more known demographic attribute values being associated with an online document included in a plurality of second online documents, wherein each of the second online documents has a known value for the demographic attribute,
    2) accepting tracked Internet surfing behavior of a plurality of Independent users,
    3) for each of the one or more first online documents, and for each of a plurality of other first and second online documents, analyzing the tracked Internet surfing behavior of a plurality of independent users to determine a probability that a user who has visited the other online document, will visit or has visited the first online document,
    4) determining, by the computer system, for each of the one or more first online documents, the estimated demographic attribute value of the first online document using (i) the accepted known demographic attribute value of each of the second online documents and (ii) the determined probabilities that a particular user who has visited the other online document, will visit or has visited the first online document,
    5) determining, for each of the one or more first online documents, an updated estimated demographic attribute value of the first online document using (i) the known demographic attribute value of each of the second online documents and the determined demographic attribute value of each of the other first online documents and (ii) the determined probabilities that a user will visit or has visited the first online document and each of the other online documents, and
    6) associating the demographic attribute and its determined estimated demographic attribute value with the first online document,
      wherein each of the plurality of second online documents is one of (A) a Website, or (B) a Web page for which the demographic attribute value of the demographic attribute is known, and
      wherein the first online document is one of (A) a Website, or (B) a Web page for which the estimated demographic attribute value of the demographic attribute is determined.

14. The apparatus of claim 13 wherein each of the first online documents does not initially have a value for the demographic attribute.

15. Apparatus for determining an estimated demographic attribute value of a first online document, the apparatus comprising:
  a) a network-based server module for accepting demographic attributes for documents on the network to determine document visit probabilities, including
    1) a set of one or more known values of a demographic attribute, each of the one or more known demographic attribute values being associated with an online document included in a plurality of second online documents, wherein each of the second online documents has a known value for the demographic attribute, and
    2) tracked Internet surfing behavior of a plurality of Independent users;
  b) a network-based server module for analyzing, for each of the second online documents having an accepted known demographic attribute value, the tracked Internet surfing behavior of the plurality of independent users to determine a probability that a user who has visited the second online document will visit or has visited the first online document, wherein the probability represents a single pair-wise relation between the second online document and the first online document;
  c) a network-based server module for determining the estimated demographic attribute value of the first online document using (i) the accepted known demographic attribute value of each of the second online documents and (ii) the determined probabilities; and
  d) a network-based server module for associating the demographic attribute and its determined estimated demographic attribute value with the first online document,
    wherein each of the plurality of second online documents is one of (A) a Website, or (B) a Web page for which the demographic attribute value of the demographic attribute is known, and
    wherein the first online document is one of (A) a Website, or (B) a Web page for which the estimated demographic attribute value of the demographic attribute is determined.

16. The apparatus of claim 15 wherein the network-based server modules are part of an advertising server network.

17. The apparatus of claim 15 wherein the network-based server modules are part of a distributed server network.

18. The apparatus of claim 15 wherein the second and first online documents are both Web pages.

19. The apparatus of claim 15 wherein the second and first online documents are both Websites.

20. The apparatus of claim 15 wherein the first online document does not initially have a value for the demographic attribute.

21. Apparatus for determining an estimated demographic attribute value of a set of one or more first online documents, the apparatus comprising:
  a) a network-based server module for accepting demographic attributes for documents on the network to determine document visit probabilities, including
    1) a set of one or more known values of a demographic attribute, each of the one or more known demographic attribute values being associated with an online document included in a plurality of second online documents, wherein each of the second online documents has a known value for the demographic attribute, and
    2) tracked Internet surfing behavior of a plurality of Independent users;
  b) a network-based server module for analyzing, for each of the one or more first online documents, and for each of a plurality of other first and second online documents, the tracked Internet surfing behavior of the plurality of independent users to determine a probability that a user who has visited the other online document, will visit or has visited the first online document;
  c) a network-based server module for determining, for each of the one or more first online documents, the estimated demographic attribute value of the first online document using (i) the accepted known demographic attribute value of each of the second online documents and (ii) the determined probabilities that a particular user who has visited the other online document, will visit or has visited the first online document;

d) a network-based server module for determining, for each of the one or more first online documents, an updated estimated demographic attribute value of the first online document using (i) the known demographic attribute value of each of the second online documents and the determined demographic attribute value of each of the other first online documents and (ii) the determined probabilities that a user will visit or has visited the first online document and each of the other online documents; and e) a network-based server module for associating the demographic attribute and its determined estimated demographic attribute value with the first online document, wherein each of the plurality of second online documents is one of (A) a Website, or (B) a Web page for which the demographic attribute value of the demographic attribute is known, and wherein the first online document is one of (A) a Website, or (B) a Web page for which the estimated demographic attribute value of the demographic attribute is determined.

22. The apparatus of claim 21 wherein the network-based server modules are part of an advertising server.

23. The apparatus of claim 21 wherein the network-based server modules are part of a distributed server network.

24. The apparatus of claim 21 wherein the second and first online documents are, both Web pages.

25. The apparatus of claim 21 wherein the second and first online documents are both Websites.

26. The apparatus of claim 21 wherein each of the first online documents does not initially have a value for the demographic attribute.

* * * * *